(12) United States Patent
Bell

(10) Patent No.: US 7,107,371 B1
(45) Date of Patent: Sep. 12, 2006

(54) METHOD AND APPARATUS FOR PROVIDING AND EMBEDDING CONTROL INFORMATION IN A BUS SYSTEM

(75) Inventor: D. Michael Bell, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 936 days.

(21) Appl. No.: 08/934,968

(22) Filed: Sep. 22, 1997

(51) Int. Cl.
*G06F 1/00* (2006.01)

(52) U.S. Cl. .............................. 710/104; 710/8; 710/16; 710/305

(58) Field of Classification Search ................. 395/287, 395/286, 284, 290, 308, 309, 311, 823, 825, 395/828, 836, 857; 710/8–19, 104–111, 305–315
See application file for complete search history.

(56) References Cited

U.S. PATENT DOCUMENTS

| | | | |
|---|---|---|---|
| 3,764,920 A | 10/1973 | Galcik et al. | |
| 4,503,499 A | 3/1985 | Mason et al. | |
| 4,719,621 A | 1/1988 | May | 370/85 |
| 4,922,486 A | 5/1990 | Lidinsky et al. | |
| 4,941,089 A | 7/1990 | Fischer | |
| 5,101,347 A | 3/1992 | Balakrishnan et al. | 395/800 |
| 5,193,090 A | 3/1993 | Filipiak et al. | 370/94.1 |
| 5,210,858 A | 5/1993 | Jensen et al. | |
| 5,257,258 A | 10/1993 | Birman et al. | |
| 5,325,492 A * | 6/1994 | Bonevento et al. | 395/325 |
| 5,361,252 A | 11/1994 | Sallberg et al. | 370/17 |
| 5,404,171 A | 4/1995 | Golstein et al. | 348/459 |
| 5,448,708 A * | 9/1995 | Ward | 395/200.13 |
| 5,467,464 A | 11/1995 | Oprescu et al. | 395/550 |
| 5,471,587 A | 11/1995 | Fernando | |
| 5,491,799 A * | 2/1996 | Kreuzenztein et al. | 395/200.08 |
| 5,499,338 A | 3/1996 | Gercekci et al. | 395/183 |
| 5,541,919 A | 7/1996 | Yong et al. | |
| 5,548,733 A | 8/1996 | Sarangdhar et al. | 395/286 |
| 5,574,862 A * | 11/1996 | Marianetti, II | 395/200.08 |
| 5,625,779 A | 4/1997 | Solomon et al. | 395/293 |
| 5,634,015 A | 5/1997 | Chang et al. | 395/349 |
| 5,657,457 A | 8/1997 | Gaskins | 395/287 |
| 5,659,718 A | 8/1997 | Osman et al. | 395/551 |
| 5,668,971 A | 9/1997 | Neufeld | 711/111 |
| 5,671,441 A * | 9/1997 | Glassen et al. | 395/828 |
| 5,715,438 A | 2/1998 | Silha | |
| 5,729,760 A | 3/1998 | Poisner | 395/823 |
| 5,751,969 A | 5/1998 | Kapoor | 395/200 |
| 5,758,166 A | 5/1998 | Ajanovic | 395/728 |
| 5,764,961 A | 6/1998 | Bhat | |
| 5,768,545 A | 6/1998 | Solomon et al. | 395/306 |
| 5,768,546 A | 6/1998 | Kwon | 395/307 |
| 5,768,550 A | 6/1998 | Dean et al. | |
| 5,771,356 A | 6/1998 | Leger et al. | 395/200 |

(Continued)

OTHER PUBLICATIONS

Gales, and Williams, "Performance Optimizations, Implementation, and Verification of the SGI Challenge Multiprocessor", Silicon Graphics Computer Systems, Proceedings of the Twenty–Seventh Annual Hawaii International Conference on System Sciences, 1994.

*Primary Examiner*—Paul R. Myers
*Assistant Examiner*—Raymond N Phan
(74) *Attorney, Agent, or Firm*—Blakely, Sokoloff, Taylor & Zafman LLP

(57) ABSTRACT

A system and method for sending device specific data in a bus transaction. A device configurable field is preallocated in a packet sent by the sending device to a receiving device. The sending device can configure the data to be stored in the device configurable field. Upon receipt of the packet, the receiving device generates a response packet in which the contents of the device configurable field is simply copied into a corresponding field in the response packet.

10 Claims, 20 Drawing Sheets

U.S. PATENT DOCUMENTS

| | | |
|---|---|---|
| 5,784,579 A | 7/1998 | Pawlowski et al. ......... 395/286 |
| 5,802,278 A | 9/1998 | Isfeld et al. |
| 5,862,338 A | 1/1999 | Walker et al. |
| 5,894,567 A | 4/1999 | Dodd et al. |
| 5,905,766 A | 5/1999 | Nguyen |
| 6,044,474 A | 3/2000 | Klein |
| 6,330,650 B1 | 12/2001 | Toda et al. |
| 6,347,351 B1 | 2/2002 | Osborne et al. |

* cited by examiner

| SIGNAL | SRC | DEST. | DEFINITION |
|---|---|---|---|
| XCLKOUT | CONTROLLER | EXT. CLK DRIVER | A COPY OF THE CONTROLLER CORE CLOCK GENERATED BY THE XCLK PLL. AN EXTERNAL LOW SKEW CLOCK DRIVER DISTRIBUTES A BUFFERED VERSION TO THE PXB AND BACK INTO THE CONTROLLER TO THE PLL FEEDBACK. THERE IS ONE OF THESE FOR EACH BUS. |
| XCLK | EXT. CLK DRIVER | PXB | THE BUFFERED VERSION OF THE XCLKOUT FROM THE EXTERNAL LOW SKEW CLOCK DRIVER SENT TO THE PXB. THERE IS ONE OF THESE FOR EACH BUS. |
| XCLK_IN | EXT. CLK DRIVER | CONTROLLER | THE BUFFERED VERSION OF THE XCLKOUT FROM THE EXTERNAL LOW SKEW CLOCK DRIVER SENT TO THE CONTROLLER FOR THE XCLK PLL FEEDBACK. THERE IS ONE OF THESE FOR EACH BUS. |
| RESET | CONTROLLER | PXB | SYSTEM RESET GENERATED BY THE CONTROLLER. |
| XRST # | CONTROLLER | PXB | PXB RESET GENERATED BY THE CONTROLLER. THERE IS A SEPARATE ONE FOR EACH PXB. THE CONTROLLER AND PXB SOURCE SYNCHRONOUS DATA STROBES START RUNNING ON THE FIRST CLOCK AFTER OBSERVING XRST # DEASSERT. |
| XRSTIN # | CONTROLLER | CONTROLLER | A COPY OF XRST # FED BACK INTO THE CONTROLLER SO THAT THE PXB AND CONTROLLER SEE XRST # DEASSERT ON THE SAME CLOCK. |

FIG. 2B

| SIGNAL | SRC | DEST. | DEFINITION |
|---|---|---|---|
| X_P_STB # | PXB | CONTROLLER | PCI EXPANDER POSITIVE DATA STROBE SOURCES SYNCHRONOUS CLOCK STROBE SENT FROM PXB TO CONTROLLER WITH POSITIVE PHASE DATA. THIS STROBE CLOCK STARTS RUNNING ON THE FIRST CLOCK AFTER OBSERVING XRST# DEASSERT. THE STROBE IS FREE-RUNNING UNTIL ANOTHER ASSERTION OF XRST#. |
| X_N_STB # | PXB | CONTROLLER | PCI EXPANDER NEGATIVE DATA STROBE SOURCE SYNCHRONOUS CLOCK STROBE SENT FROM PXB TO CONTROLLER WITH NEGATIVE PHASE DATA. THIS STROBE CLOCK STARTS RUNNING ON THE FIRST CLOCK AFTER OBSERVING XRST# DEASSERT. THE STROBE IS FREE-RUNNING UNTIL ANOTHER ASSERTATION OF XRST#. |
| B_P_STB # | CONTROLLER | PXB | CONTROLLER POSITIVE DATA STROBE SOURCE SYNCHRONOUS CLOCK STROBE SENT FROM CONTROLLER TO PXB WITH POSITIVE PHASE DATA. THIS STROBE CLOCK STARTS RUNNING ON THE FIRST CLOCK AFTER OBSERVING XRST # DEASSERT. THE STROBE IS FREE - RUNNING UNTIL ANOTHER ASSERTION OF XRST#. |
| B_N_STB # | CONTROLLER | PXB | CONTROLLER NEGATIVE DATA STROBE SOURCE SYNCHRONOUS CLOCK STROBE SENT FROM CONTROLLER TO PXB WITH NEGATIVE PHASE DATA. THIS STROBE CLOCK STARTS RUNNING ON THE FIRST CLOCK AFTER OBSERVING XRSTIN # DEASSERT. THE STROBE IS FREE - RUNNING UNTIL ANOTHER ASSERTATION OF XRST#. |
| XRTS # | PXB | CONTROLLER | PCI EXPANDER REQUEST TO SEND REQUEST TO USE THE BI - DIRECTIONAL BUS SENT FROM PXB TO CONTROLLER SYNCHRONOUS TO XCLK#. |

FIG. 2C

| SIGNAL | SRC | DEST. | DEFINITION |
|---|---|---|---|
| HRTS # | CONTROLLER | PXB | CONTROLLER REQUEST TO SEND REQUEST TO USE THE BI-DIRECTIONAL BUS SENT FROM CONTROLLER TO PXB SYNCHRONOUS TO XCLK. |
| XADS # | CONTROLLER / PXB | CONTROLLER / PXB | PCI EXPANDER ADDRESS/DATA STROBE BI-DIRECTIONAL SIGNAL ASSERTED BY THE SENDING AGENT DURING EVERY CLOCK OF A PACKET TRANSMISSION EXCEPT THE LAST CLOCK. IN A SINGLE CLOCK TRANSMISSION SUCH AS A COMPLETION PACKET WITH NO DATA, X_ADS# IS ASSERTED FOR ONE CLOCK. |
| XBE[1:0]# | CONTROLLER / PXB | CONTROLLER / PXB | PCI EXPANDER BYTE ENABLES BI-DIRECTIONAL SIGNALS ASSERTED IN PHASE WITH DATA ON THE BUS TO INDICATE VALID BYTES DURING THE DATA PHASES OF A PACKET TRANSMISSION. RESERVED FUNCTION DURING HEADER PHASES. |

FIG. 2D

| SIGNAL | SRC | DEST. | DEFINITION |
|---|---|---|---|
| XD[15:0]# | CONTROLLER / PXB | CONTROLLER / PXB | PCI EXPANDER DATA BUS BI - DIRECTIONAL BUS TRANSFERS PACKETS BETWEEN THE CONTROLLER AND PXB. |
| XADS # | CONTROLLER / PXB | CONTROLLER / PXB | PCI EXPANDER BUS PARITY BI - DIRECTIONAL SIGNAL INDICATES EVEN PARITY ACROSS XD[15:0] AND XBE[1:0]. MUST BE VALID FOR EVERY HALF CLOCK PHASE OF A PACKET TRANSMISSION. INVALID PARITY WILL BE GENERATED FOR DATA THAT HAD UNCORRECTABLE MEMORY OR BUS ERRORS. A PARITY SIGNAL IS CORRECT IF THERE ARE AN EVEN NUMBER OF ELECTRICALLY LOW SIGNALS IN THE SET INCLUDING THE COVERED SIGNALS PLUS THE PARITY SIGNALS. |

FIG. 2E

FIGURE 5: F16 DATA TRANSMISSION DETAIL

REQUEST PACKET FORMAT

| CLK CYCLE | BE[1:0] TP[1:0] | XD[15] | XD[14:12] | XD[11] | XD[10] | XD[9:8] | XD[7] | XD[6:4] | XD[3:2] | XD[1:0] |
|---|---|---|---|---|---|---|---|---|---|---|
| 1P | 0,X | LH=1 | ROUTE[3:0] | | CA[5:2] | | | RCOM[4:0] | | |
| 1N | TID[7:0] | | | | | LEN[7:0] | | | | TID[9:8] |
| 2P | RBE[5:0] | | | A[35:24] | | | | | | RBE[7:6] |
| 2N | A[23:6] | | | | | | | A[43:36] | | |
| 3P | RESERVED | | | | | | | | | |
| 3N | RESERVED | | | | | | | RESERVED | | |
| 4P | BE[3:2] | DATA[31:24] | | | | | | DATA[23:16] | | |
| 4N | BE[1:0] | DATA[15:8] | | | | | | DATA[7:0] | | |

FIG. 10A

COMPLETION PACKET FORMAT

| F16 CLK CYCLE | BE[1:0] TP[1:0] | XD[15] | XD[14:12] | XD[11] | XD[10] | XD[9:7] | XD[6:4] | XD[3:2] | XD[1:0] |
|---|---|---|---|---|---|---|---|---|---|
| 1P | 1,x | NA | ROUTE[3:0] | | CA[5:2] | | CCOM[4:0] | | TID[9:8] |
| 1N | TID[7:0] | | | | | LEN[7:0] | | | RBE[7:6] |
| 2P | BE[3:2] | DATA[31:24] | | | | | DATA[23:16] | | |
| 2N | BE[1:0] | DATA[15:8] | | | | | DATA[7:0] | | |

FIG. 10B

PACKET FIELDS

| COMMAND | DESCRIPTION |
|---|---|
| RCOM (COMMANDS) | INTERRUPT ACKNOWLEDGE; SPECIAL TRANSACTION; I/O READ; MEMORY READ; MEMORY WRITE; CHECK CONNECTION; UNLOCK; CONFIGURATION READ; CONFIGURATION WRITE; SSBR; RSBR; LOCKED READ; MEMORY WRITE LINE |
| CCOM[4:0] (COMPLETION COMMANDS) | RETURNS STATUS OF ASSOCIATED REQUEST: NORMAL READ; NORMAL WRITE; RETRY READ; RETRY WRITE (MAP TO HARD FAIL); HARD FAIL READ; HARD FAIL WRITE; SHORT PACKET READ; SHORT PACKET WRITE (MAP TO HARD FAIL) |
| TID[9:0] (TRANSACTION ID) | "SCRATCH PAD" CREATED BY REQUESTOR - UNMODIFIED BY TARGET. USED BY REQUESTOR TO TRACK COMPLETIONS AS THEY RETURN. |
| LEN[7:0] (DATA LENGTH IN DWORDS) | INDICATES NUMBER OF DWORDS REQUESTED AND NUMBER OF DWORDS RETURNED OF TO DE-ALLOCATE; DATA BUFFER TRACKER ADDS THIS NUMBER TO THE WRITE BUFFER POOL WHEN A WRITE RETURNS |
| RBE[7:0] (REQUEST BYTE ENABLES) | ACTIVE BYTES FOR REQUESTS OF 8 BYTES OR LESS; RBE[7:4] IS ALWAYS THE ODD DWORD BES; RBE[3:0] IS ALWAYS THE EVEN DWORD BES |
| A[43:36] (REQUEST ADDRESS) | A[43:36] IN LONG HEADER FORMAT ONLY; SHORT HEADER ONLY BEING VALIDATED ON 450 NX. 460 GX POR DOES NOT USE LONG HEADER |
| SSBR (SECURE SIDEBAND REQUEST) | ISSUED BY PXB TO MIOC WHEN PHOLD ASSERTS; MIOC BLOCKS FURTHER OUTBOUND REQUESTS TO COMPATIBILITY PCI BUS |
| RSBR (REMOVE SIDEBAND REQUEST) | ISSUED BY PBX TO MIOC WHEN PHOLD DEASSERTS - NOT PASSIVE RELEASE |

FIG. 10C

| COMMAND | PACKET FIELDS DESCRIPTION |
|---|---|
| LOCKED READ | ISSUED BY MIOC TO PBX FOR THE FIRST READ OF A LOCKED SEQUENCE; MIOC BLOCKS FURTHER REQUESTS TO THE TARGETED PCI BUS EXCEPT BY THE AGENT INITIATING THE LOCK |
| UNLOCK | ISSUED BY MIOC TO PBX WHEN FSB LOCK NUMBER SIGNAL DEASSERTS |

FIG. 10D

METHOD AND APPARATUS FOR PROVIDING AND EMBEDDING CONTROL INFORMATION IN A BUS SYSTEM

FIELD OF THE INVENTION

The present invention is related to a synchronous bus system and method.

ART BACKGROUND

Buses are frequently used to transmit data between devices. Generally two types of buses are used, synchronous and asynchronous. In a synchronous system, the devices coupled to the bus operate synchronous to one another. Furthermore, the timing budget for data transmission, that is the time from outputting the data from the transmitting device to the time that the receiving device samples the data, is one clock cycle. As the complexity of computer systems has increased, it has become increasingly difficult to physically connect the devices close enough such that the time of flight across the connection plus the set up and hold time of the receiving device do not exceed the timing budget.

In an asynchronous system it is not necessary that the clocks of the receiving and sending devices are synchronous to one another. However, the receiving device has to include logic to wait a number of clock cycles before reading out the captured data and sampling the captured data in order to ensure that the data is stable.

SUMMARY OF THE INVENTION

The system and method of the present invention provides for sending device specific data in a bus transaction by preallocating a device configurable field the contents of which is configurable by the device sending a request. Upon receipt of the request, the receiving device responds to the request and generates a reply. The reply includes a field that the receiving device simply copies the contents of the device configurable field into a corresponding field of the reply. The reply therefore conveys back the same information in the corresponding field, thereby enabling the sending device to use the field for a variety of purposes.

BRIEF DESCRIPTION OF THE DRAWINGS

The objects, features, and advantages of the present invention will be apparent to one skilled in the art in view of the following detailed description in which:

FIGS. 2a, 2b, 2c, 2d and 2e illustrate the signaling topology of one embodiment of the bus system of the present invention.

FIGS. 10a, 10b, 10c, and 10d illustrate request and completion formats used in one embodiment of the system of the present invention.

DETAILED DESCRIPTION

Figure 1:
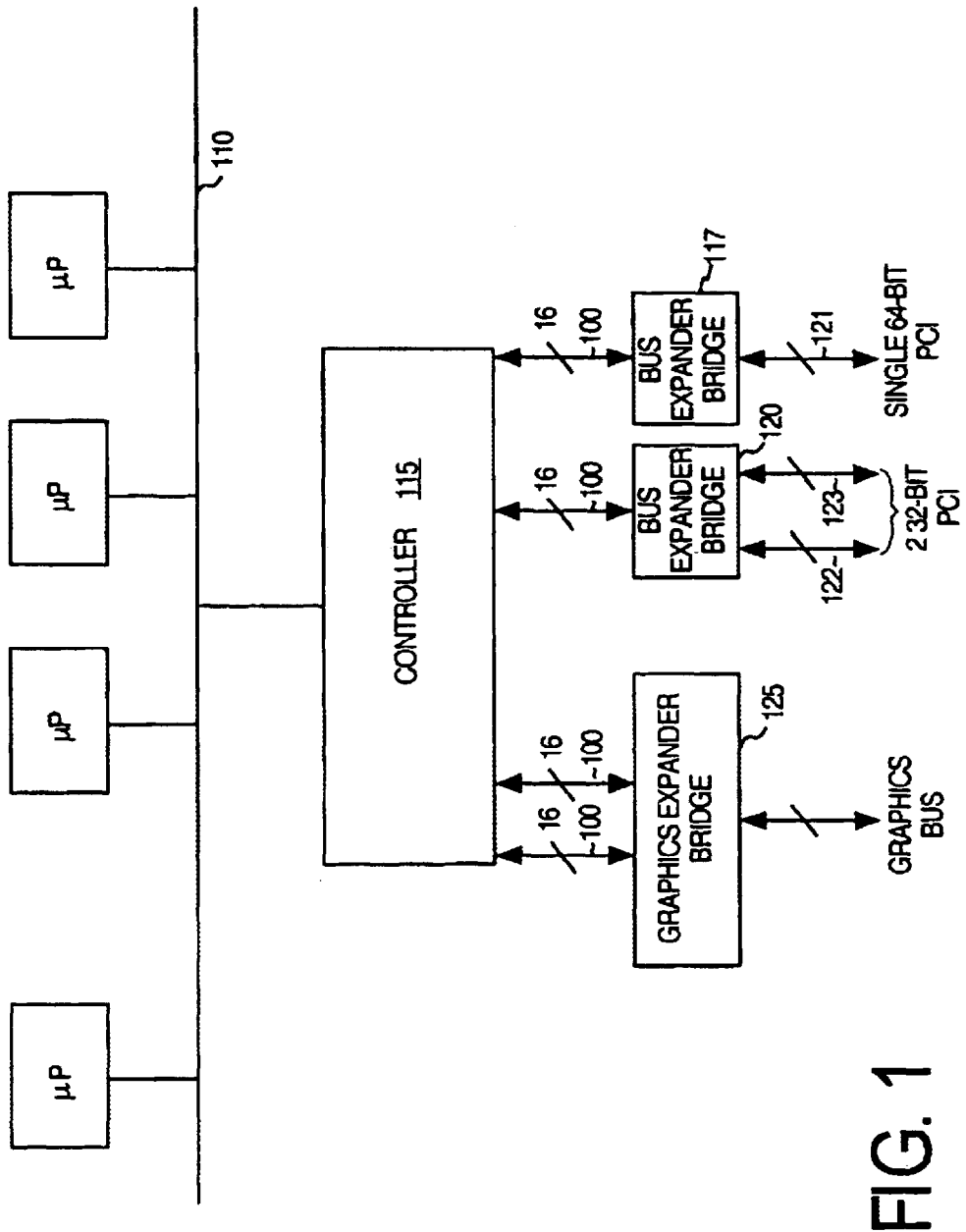
FIG. 1 is an example of a system utilizing the bus system of the present invention.

An exemplary system which incorporates the teachings of the present invention is shown in FIG. 1. It is readily apparent that the present invention is applicable to a variety of systems and system configurations. FIG. 1 is illustrative of the bandwidth that the bus system of the present invention can provide. Referring to FIG. 1, the synchronous bus system 100 shown provides connections between a controller 115, which functions as a bridge between a microprocessor bus 110, to which one or more microprocess devices are connected, or a memory bus (not shown) to which one or more memory devices are connected, and bus expander bridges 117, 120, and 125. As is shown in one embodiment, bridges 117 and 120 expand and format the data received across the bus 100 to provide output to a 64 bit Peripheral Component Interface (PCI) bus 121 or two 32 bit PCI buses 122, 123 to which PCI compatible devices (not shown) are connected. Furthermore, it is illustrated that the bus 100 can provide data to a bridge that interfaces to a graphics bus and connected devices (not shown).

Figure 2A:
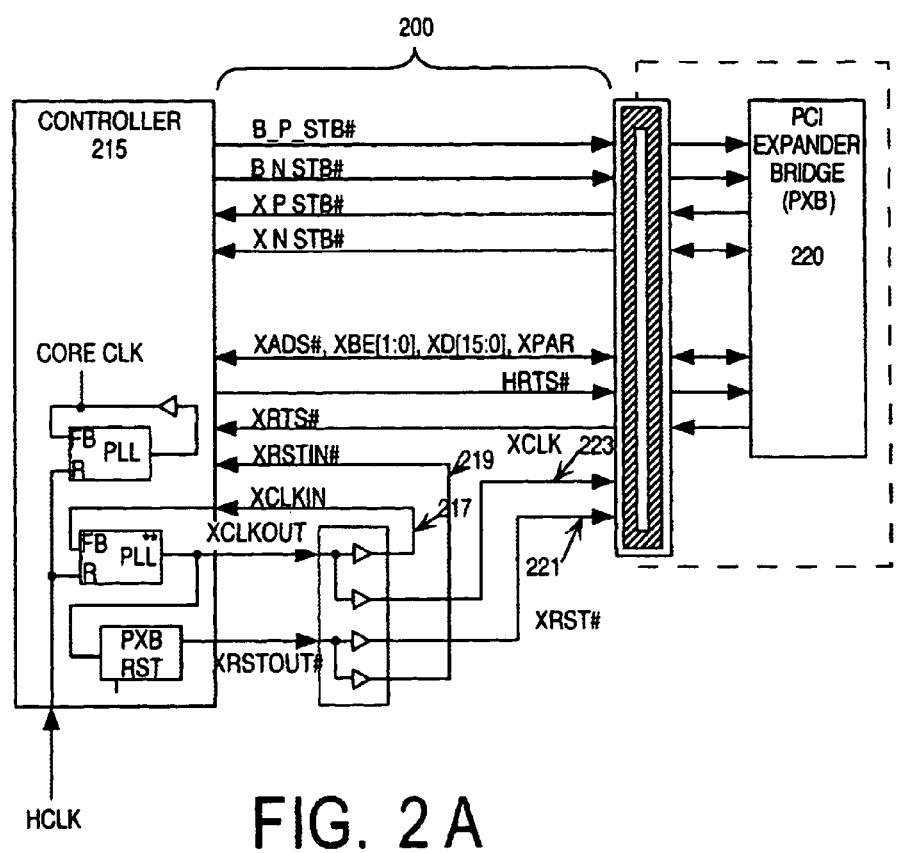

The signaling topology of the bus system of the present invention is illustrated in FIGS. 2a, 2b, 2c, 2d and 2e. Referring to FIG. 2a, synchronous bus 200 connects a controller 215 to an expander bridge 220, such as a PCI expander bridge which bridges to a PCI bus (not shown). In the present embodiment, a controller is shown to be connected to a bus expander bridge via the bus. However, it is readily apparent that the bus can connect a variety of types of devices and subsystems. FIGS. 2b, 2c, 2d and 2e are tables describing the different signals used in the present embodiment.

In one embodiment, the bus is a 16 bit wide data bus, which carries commands, addresses, data and transaction ID information. In addition, two additional bits carry mask and other information for the data fields. In one embodiment, the function of the two additional bits varies according to the clock cycle. For example, the fields provide byte enables (mask information) identifying the bytes consisting of valid information and may alternately carry a command type or parity.

The bus is bi-directional between the sending and receiving devices. In the present embodiment, the bus transactions are full split transactions and consist of a request packet and a completion packet. The request packet initiates a transaction. Completion packets are used to return data, indicate that a transaction has completed on the destination device, and reallocate buffer sources between the source and destination device. All transactions can be classified as a read request or a write request. Read requests contain command address bit enables for non-fetchable reads, routing information and length for desired data. The read completion packet contains the status of the request, the data retrieved in response to the read request, and routing and transaction information to identify the corresponding request. A write request includes the write data in its packet. The write completion contains no data but indicates if the write is completed successfully. Each bus cycle (XCLK) is equivalent to the system host clock cycle. However, each bus cycle contains a "P" half cycle and "N" half cycle. The "P" half cycle occurs for example while XCLK clock is high. The "N" half cycle occurs while the XCLK clock is low thus the throughput is doubled by transmitting packets on each half cycle.

A packet of information consists of multiple 32 bit words. One word associated byte enables are sent over the bus each XCLK cycle. Each word is distributed between the positive and negative phase of the bus clock cycle with bits [31:16] set on the positive phase and bits [15:0] set on the negative phase. It is readily apparent that the bus is not limited to this packet structure and a variety of implementations may be used.

One key aspect of the high speed synchronous bus of the present invention is that the reset signal (XRST#) enables the synchronization of all devices connected to the bus. Once synchronized, the transmitting and receiving devices operate synchronously in accordance with prespecified timing protocols to synchronously transmit packets between devices over multiple clock cycles.

As illustrated in FIG. 2a, both the reset signal (XRST#) and clock signal (XCLK) arrive at each connected component simultaneously in order to maintain synchronous operation. In the present embodiment, the XCLK and XRST# signals are issued by one component 215 and transmitted to the second component 220 and back into the first component 215 through lines 217, 219, which are approximately equal in length to lines 221, 223 connected between the first and second components 215, 220. This ensures that both components 215, 220 receive the signals at the same time and maintain synchronous operation. Preferably the lengths of lines 217, 223 are matched as closely as possible as the clock timing is critical. The matching of lines 219, 221 may be less accurately matched in length.

Figure 3:
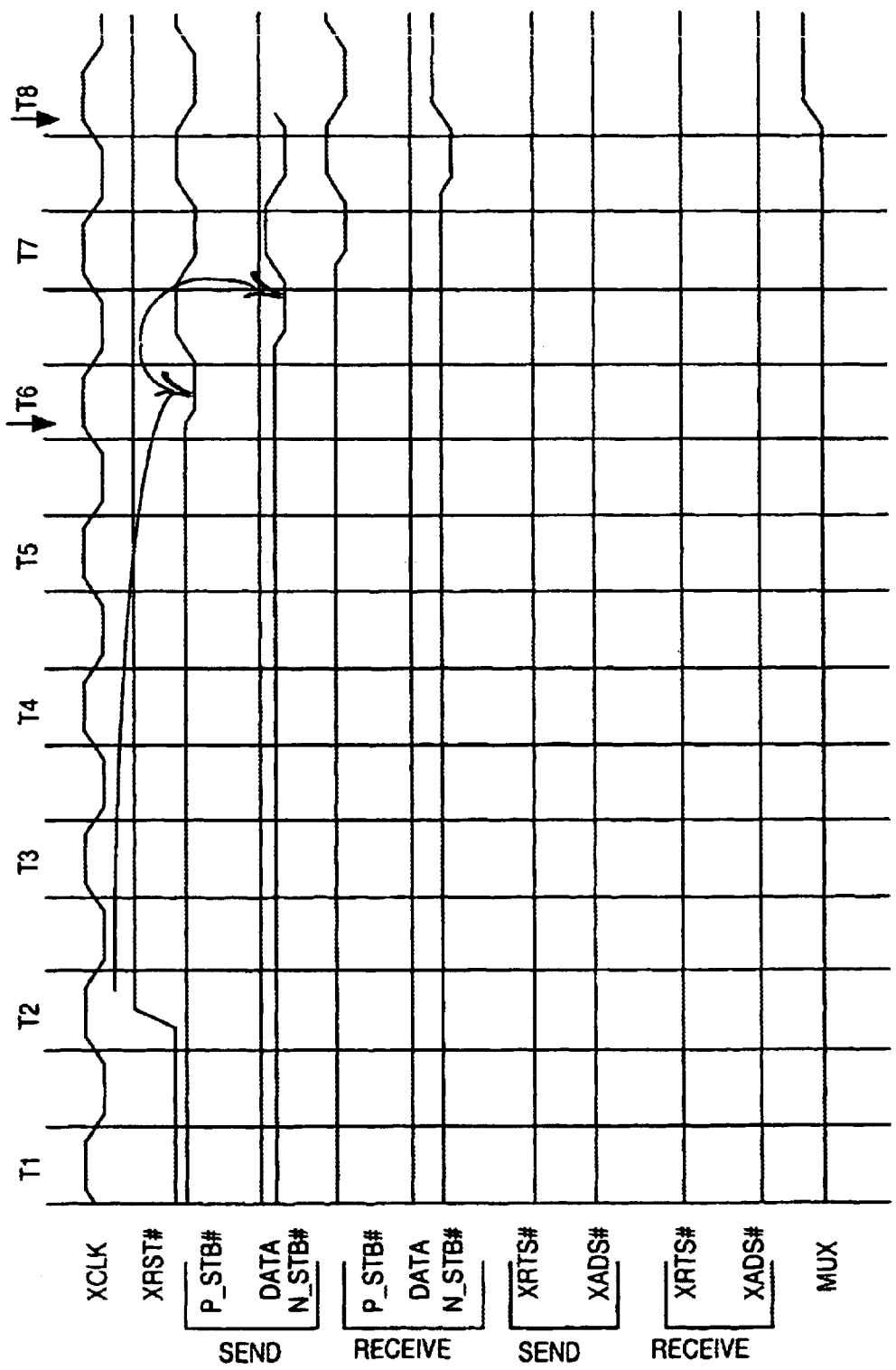
FIG. 3 is a timing diagram illustrating the strobe startup timing detail for a 2 clock cycle timing budget.

An illustrative timing diagram for the reset process for a 2 clock cycle timing budget is shown in FIG. 3. Each device connected to the bus sees the XRST# deasserted on the same generating XCLK clock signal. Each component starts its synchronous strobes signal running a predetermined number of clock cycles (e.g. three clock cycles) after observing an XRST# deassert. Although a three clock cycle is specified in the present embodiment, the number of predetermined cycles can vary so long as all devices start their synchronous strobe signal on the same cycle. With reference to FIG. 3, each device captures the XRST# deassertion on the rising edge of clock T3. Each component, therefore, initiates its strobe signal generator after the rising edge of clock T6. The source synchronous signal capture circuit can therefore synchronize its sampling clocks, since it knows the timing relationship between the XRST# deassertion and the first data strobe.

The system and timing relationships can be defined in a variety of ways. However, in the present embodiment the rising clock edge that samples XRST# deassertion is referred to the odd cycle and the first data strobe is started from an even clock edge. The earliest even clock edge that starts the strobe signals is the second even clock edge after the XRST# deassertion is sampled. In the present embodiment which implements a two clock cycle timing budget, the sampling, for reception of data, always selects the capture element (e.g. flip-flop) that contains data that was launched two clock cycles earlier. For example, in a three clock cycle mode, the selection would select that which was launched three clock cycles earlier. The multiplexor identifies the odd clock when XRST# deasserts. Since it is defined that the first strobe is always sent on an even clock, the capture flops and sampling multiplexors remain synchronized.

Figure 4:
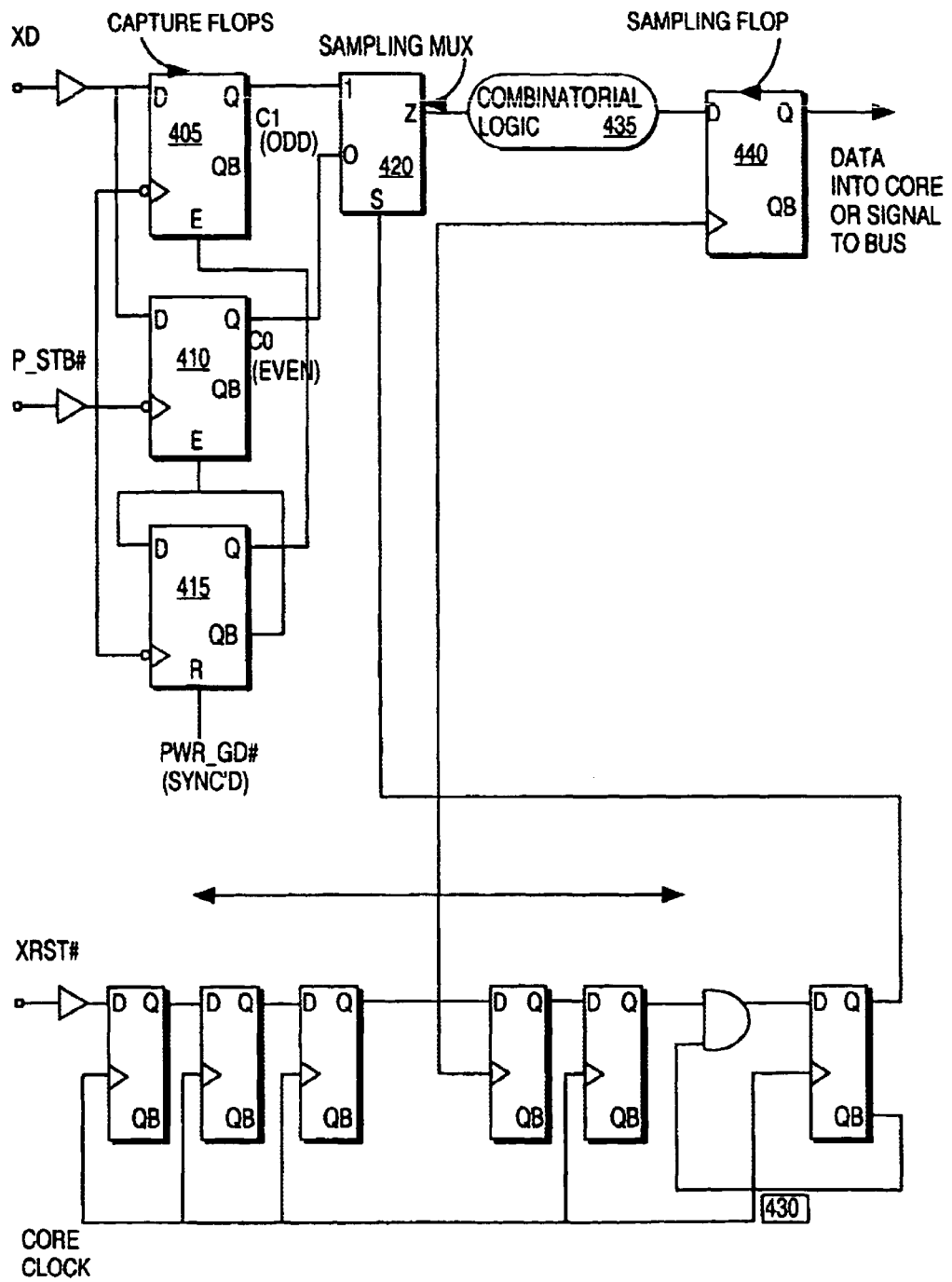
FIG. 4 illustrates the basic structure for receiving packets transmitted over the bus.

As described earlier, the distance between devices is longer than typical synchronous bus systems as the timing budget has been expanded to span multiple clock cycles. Furthermore, greater data throughput using fewer pins is achieved in part by launching data on both the even and odd numbered clock cycles. The capture mechanism at the receiver, which enables this capability as well as expansion of the timing budget, is shown in FIG. 4. Data is received via one of two capture flops 405 or 410. The flop enable is controlled by a third flop 415, which causes the enabled flop to toggle between capture flops 405 and 410, as driven by the positive data strobe signal (P_STB#). Thus, data that is launched on an even clock is captured by the even capture flop 410. Data that is captured on an odd clock is always captured by the odd capture flop 405. The present circuit, illustrated in FIG. 4, illustrates the capture circuitry for the positive data phases of the signals. Therefore, a negative data phase capture circuit would also be included driven by a negative strobe signal (N_STB#). In such a circuit the core clock-to-sampling flop would also be inverted.

Referring again to FIG. 4, the sampling multiplexor 420 samples the data from the capture flops two clock cycles after transmission of the data was initiated (i.e. launched). The multiplexor 420 is synchronized by the reset signal XRST# and the circuitry 430, which is driven by the reset signal. Thus, as the sampling multiplexor 420 is synchronized to sample initially on the even clock and the data first arrives on the even, clock as shown in the strobe start up timing detail, the multiplexor 420 properly samples the odd and even clocks data two cycles after launch.

Once the data is processed through the sampling multiplexor, the data is input to combinatorial logic and into a sampling flip-flop 440. This is subsequently output into other circuitry of the device. It should be noted that the circuitry 430 shows a number of flip-flops which cause a delay sufficient to provide adequate initialization for valid sampling of data. The delay path synchronizes the sampling multiplexor 420 to the launched data. The delay can be varied according to the configuration implemented. Preferably, as shown in FIG. 2, XCLKout (the clock signal) and XRSTout# (the reset signal) are generated by a common source. Both are generated by the controller in the present embodiment and are kept synchronous by routing both through an external clock driver and maintaining approximately the same routing signal line length as shown in FIG. 2. It is preferred that the length of the bus is limited by the following factors: XCLK, XCLK to P_STB#+TOF (time of flight between devices)+P_STB# to capture data valid+set up time for P data sample is less than or equal to the number of allocated clock periods (in the present illustration two clock periods). Thus, in the present embodiment, the delay through the combinatorial logic 435 between the sampling flop and sampling multiplexor must be included in the set up time. Preferably, the turn around time from receiving to sending must increase from one XCLK period to two when XCLK to P_STB+TOF is greater than or equal to one clock cycle. This is required to prevent sending data from colliding with the trailing negative data phase receive data.

Figure 5:
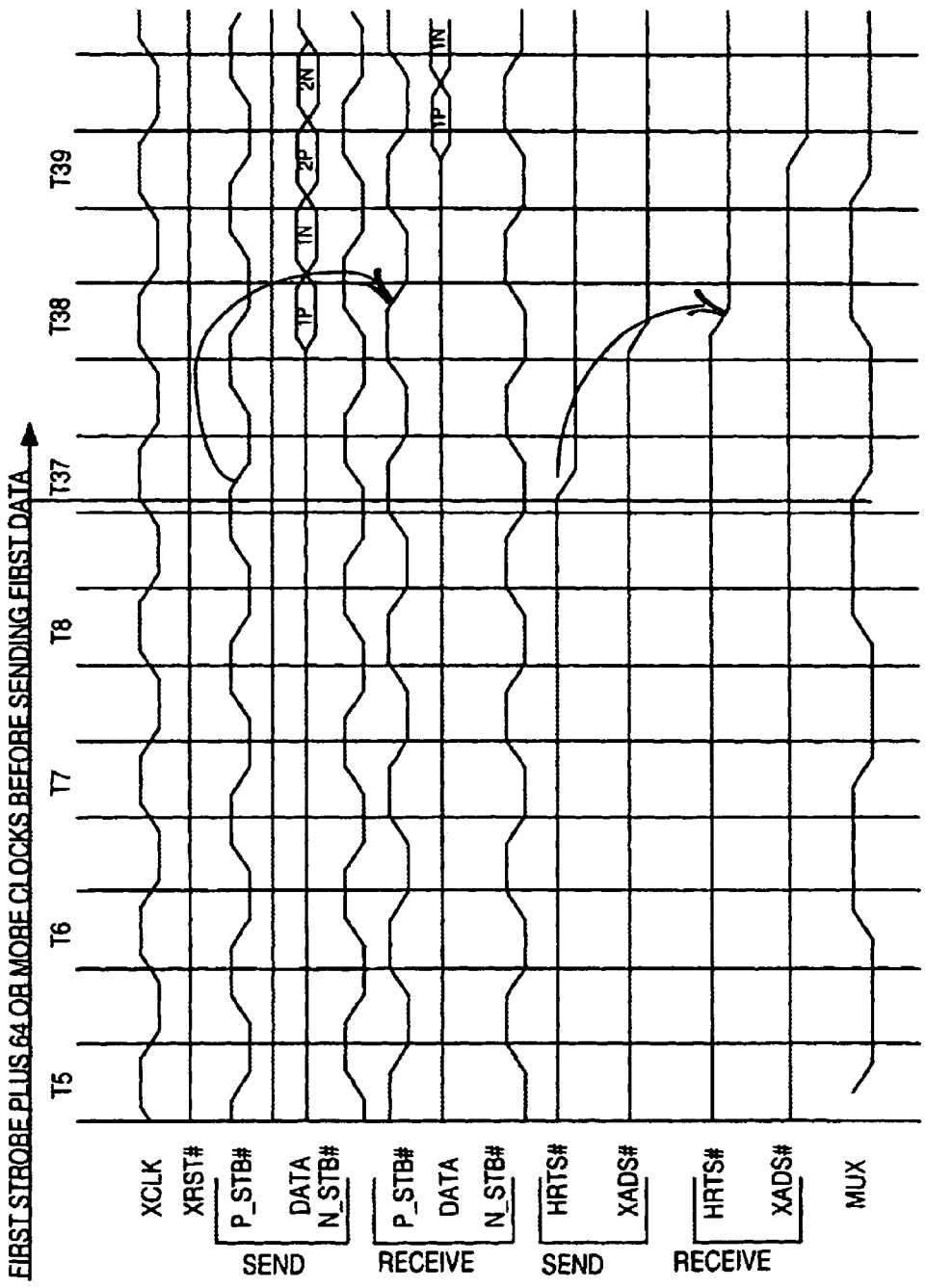
FIG. 5 is a timing diagram illustrating the data transmission detail.

A timing circuit showing the timing of exemplary packet transmissions is shown in FIG. 5. Referring to FIG. 5, XRST# already has deasserted at some time prior to T5. The strobes (P_STB#, N_STB#) already are running and the sampling circuitry is synchronized. Signals bracketed at the left and labeled "send" indicate the observed signal timing at the sending end. "Receive" indicates the same observed signals at the receiving end. The difference is the time shift due to the flight time of the signals between the sender device and the receiver device.

At time T37 the sender device asserts HRTS# to indicate its request to send. At time T37, XRTS# (not shown) was not observed asserted, so the sending device knows that it has won arbitration of the bus. The sender asserts XADS# at time T38 to frame the packet information indicated as 1P, 1N, 2P, 2N.

At the receiving end, the receiver device observes (captures) HRTS# asserted at time T38. This is the time shifted HRTS# signal asserted at time T37. The receiver knows to expect XADS# during the next clock (T39). The present embodiment utilizes a distributed arbiter. Thus, if the sender in this example did not have high priority, XADS# would have been sent two clocks after HRTS# instead of one clock after HRTS#. Each device knows its priority. By convention, the high priority device will send its data one clock earlier than the low priority device (assuming the low priority device was not already requesting). Therefore, the low priority device must wait an additional clock when it asserts its request in order to guarantee the high priority device has observed the request. At clock T39, the receiver samples HRTS# from the capture FLOP that captured it. Data is then sampled starting at time T39 from the respective flops.

Figure 6:
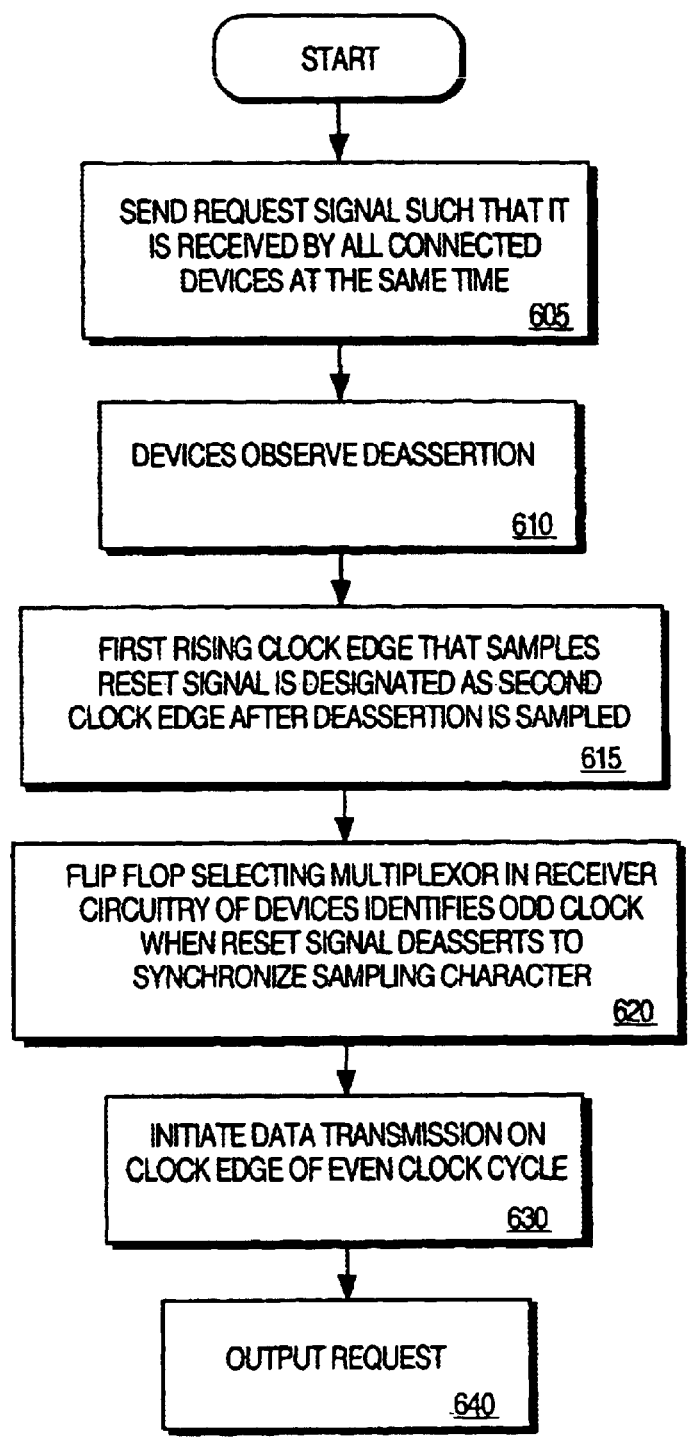
FIG. 6 is a flow chart illustrating one embodiment of the reset process utilized to synchronize the receiving device and sending device circuitry.
Figure 7:
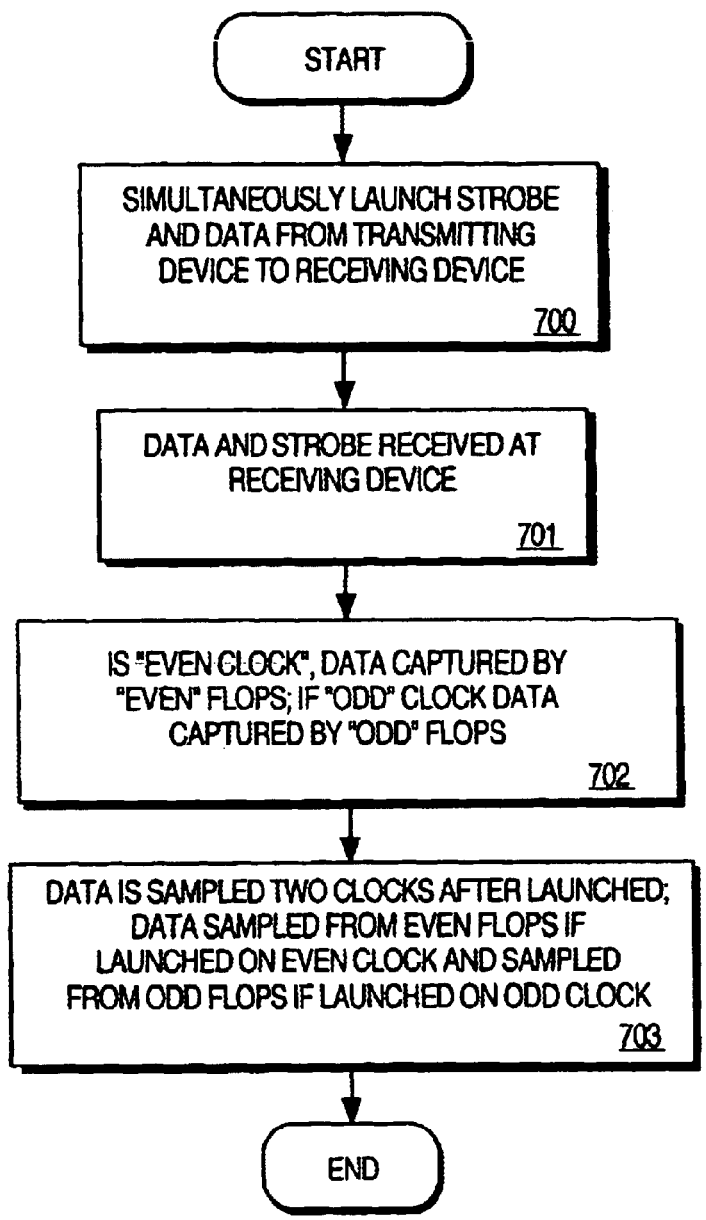
FIG. 7 is a flow diagram illustrating the packet transmission process in accordance with the teachings of the present invention.

The processes for resetting the system to operate in a synchronous matter and transmission of data are illustrated by the simplified flow diagrams FIGS. 6 and 7. The process for performing reset is generally described with reference to FIG. 6. At step 605, reset signal is sent such that it is received by all devices at the same time. Furthermore, the reset signal (XRST#) is output through drivers and fed back into the originating device such that the line lengths are compatible and the reset signal is received by all devices at the same time. The reset signal is clocked out by a PLL clock which typically is not in phase with the core clock of the controller device (e.g., device 215, FIG. 2). However, the equal length feedback trace assures that the clock (and the reset signal that is synchronous to it) will be in phase with the core clocks by the time the signal arrives at the end of the wires. The devices (e.g., 215, 220, FIG. 2), at step 610, observe the deassertion of the reset signal. At step 616, the first rising clock edge that samples the reset signal is identified as the odd clock cycle and the next edge is identified as the even clock cycle. The first data strobe therefore is designated as the second clock edge (even) after deassertion of the reset signal. At step 620, a flip-flop selecting multiplexor in the receiver circuitry of each device identifies the odd clock cycle when the reset signal is deasserted in order to synchronize sampling circuitry to the sending circuitry which issues the data strobe and data.

At step 630, data transmission is initiated on a clock edge of an even clock cycle, which coincides with the issuance of the data strobes on the even clock cycle. Preferably, the system waits a predetermined number of clock cycles, such as 64 clock cycles, before initiating data transmission such that sufficient time is given for initialization of circuitry.

The transmission process will now be described with reference to FIG. 7. At step 700 the transmitting device simultaneously launches a strobe and data to the receiving device. At step 701, the strobe and data are received at the receiving device. At step 702, if the strobe was sent on an even clock the data is captured by the even flops; if the strobe was sent on an odd clock, the data is captured by the odd flops. At step 703, data is sampled at the receiver two clocks after launch from the sending device. Thus, data is sampled by the even flop if launched on even clock cycle and sampled by the odd flop if launched on an odd clock cycle. As mentioned above, once the circuitry in both devices are synchronized, the receiver circuitry simply toggles between even flops and odd flops. Thus, a process of operation for synchronous bus transmission across multiple clock cycles in which the sending and receiving devices receive clock signals at the same frequency is described.

Although not required for operation of the high speed synchronous system as described above, the effectiveness of the system is further enhanced using the embedded flow control method and apparatus described below.

In particular, bus overhead is decreased by distributing flow control to the devices coupled to the bus and embedding flow control data into the packets. Each device has at least one tracker device or circuit that tracks the flow of data and bus requests inbound and outbound onto the bus. At initialization, each tracker is provided information regarding the buffer capacities of the other coupled devices. During the process of transmission of packets, the tracker accesses predetermined bits of each packet to determine the states of the queues (i.e., how full/empty) and controls the flow of packets between devices. Thus flow control is embedded in the packet protocol.

Figure 8:
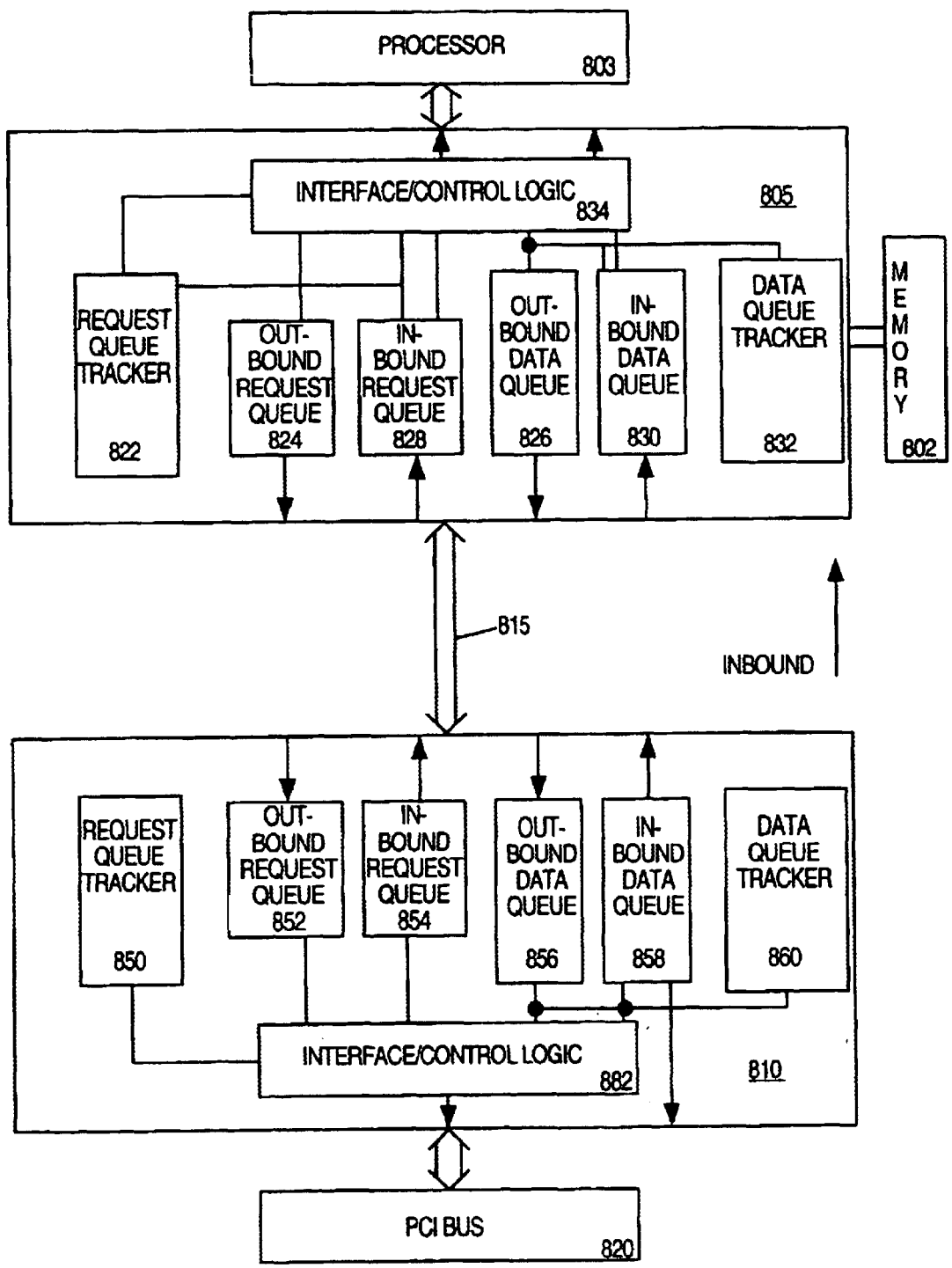
FIG. 8 is a simplified block diagram illustrating one embodiment of the flow control mechanism of the present invention.

In the present embodiment, flow control between two devices is described. However, it is contemplated that the structure can be expanded to support flow control between multiple pairs of devices by replication of trackers. A simplified block diagram of the flow control portion of the system is illustrated in FIG. 8. Referring to FIG. 8, a memory controller 805, is coupled to memory 802 and a processor 803. Alternately the memory controller is coupled to a processor bus to which one or more processes 803 are coupled. The memory controller 805 is further coupled to a bus bridge 810 through a bus 815. In one embodiment, the bus bridge 810 is connected to a PCI bus 820. The bus bridge 810 shown provides one bus connection (e.g., one 64 bit connection) to the PCI bus 820. However, it is contemplated that the bus bridge supports multiple bus connections (e.g. 2–32 bit connections). In a multiple bus connection arrangement, the tracker circuitry tracks the status of dual queues, one per connection. Furthermore, device 805 is described herein as a memory controller. However, it is readily apparent that device 805 can be a variety of types of devices that coupled to the bus 815. Similarly, device 810 can be embodied as a variety of devices and is not limited to a bus bridge.

The memory controller 805 includes request queue tracker logic 822, data queue tracker logic 832, outbound request queue 824, outbound data buffer 826, inbound request queue 828 and inbound data queue 830. Also shown is interface/control logic 834 which provides supporting logic for interfacing with the memory 802 and processor 803, performing the memory operations with memory 802 and processor 803, as well as providing the request packets and confirmation packets that are described below.

For purposes of simplification of explanation, the data communicated between the memory 802, processor 803 and the memory controller 805 is shown to be transmitted through the interface/control logic 834; however, it is contemplated that data may be transmitted directly between the queues and the memory 802 and processor 803. The request queue tracker logic 822 and data queue tracker logic 832 respectively track how full the respective queues 824, 852 and 826, 856 are, such that once queue is full, the tracker prevents a packet from being generated and placed in the queues 824, 826.

In the present embodiment, the tracker 822, 832 functions as a counter to maintain counts of available queue space. The interface/control logic 834 operates in conjunction with the tracker 822, 832 to issue the corresponding control signals/data to processor 803 and memory 802 to permit/prevent outbound packet generation and placement in the corresponding queues. Inbound request queue 828 and inbound data queue 830 respectively receive inbound requests and confirmation packets (and associated data) from the bus bridge 810. In one embodiment, the write data and read data is separately queued and tracked. In one embodiment, the request queue maintains both read and write requests, but the tracker permits only a predetermined maximum number of read requests and a predetermined number of write requests regardless of the number of available slots in the queue.

In one embodiment, the tracker logic 822 is configured to permit only two read requests and six write requests in an eight deep queue. This is desirable so that the one type of request, e.g., write request, does not prevent the queuing of read requests when the number of requests exceeds the size of a queue. Thus in the current example, if six write requests are currently queued and the device wishes to queue a seventh write request, the tracker will not permit it even though the queue has the capacity to receive two more requests (those that are preallocated per read requests). If the queue currently has six write requests and the device wishes to issue a read request, the tracker will permit the read request to be queued.

The bus bridge 810 is similarly configured with a request queue tracker 850, data queue tracker 860, outbound request queue 852, inbound request queue 854, outbound data queue 856, inbound data queue 858 and interface/control logic 882. The queue tracking functions are performed similar to that described above. Trackers 850, 860 maintain counts of information stored in the queues 854, 828, and 858, 830, respectively, and prevent the generation of packets when one of the queues is full. Interface/control logic 882 not described in detail herein represents the logic used to communicate with the bus 820 and generate the request and confirmation packets as described below.

Figure 9A:
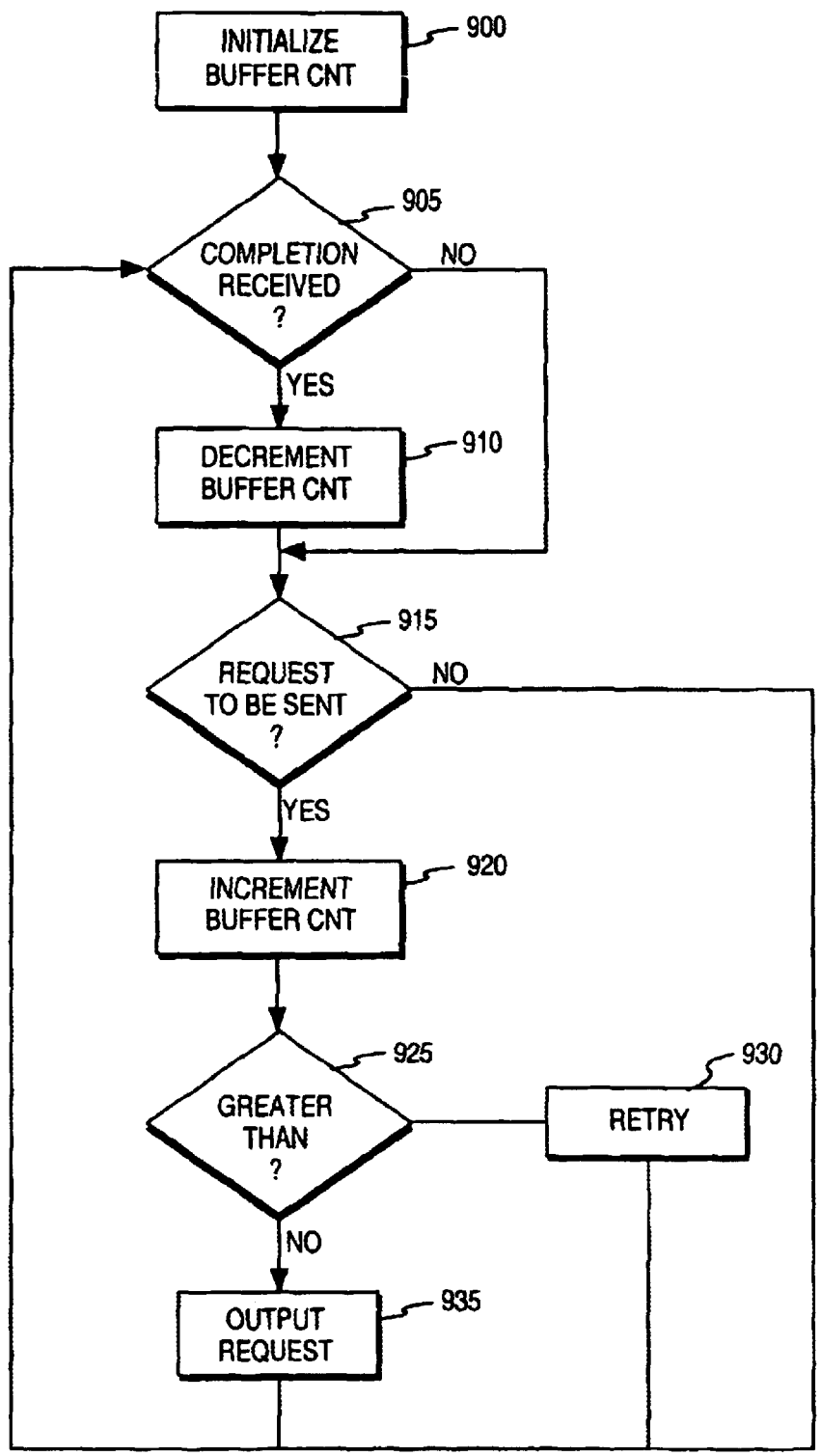
FIGS. 9a, 9b, and 9c are flow charts illustrating one embodiment of process for transmitting data in accordance with the teachings of the present invention.
Figure 9B:
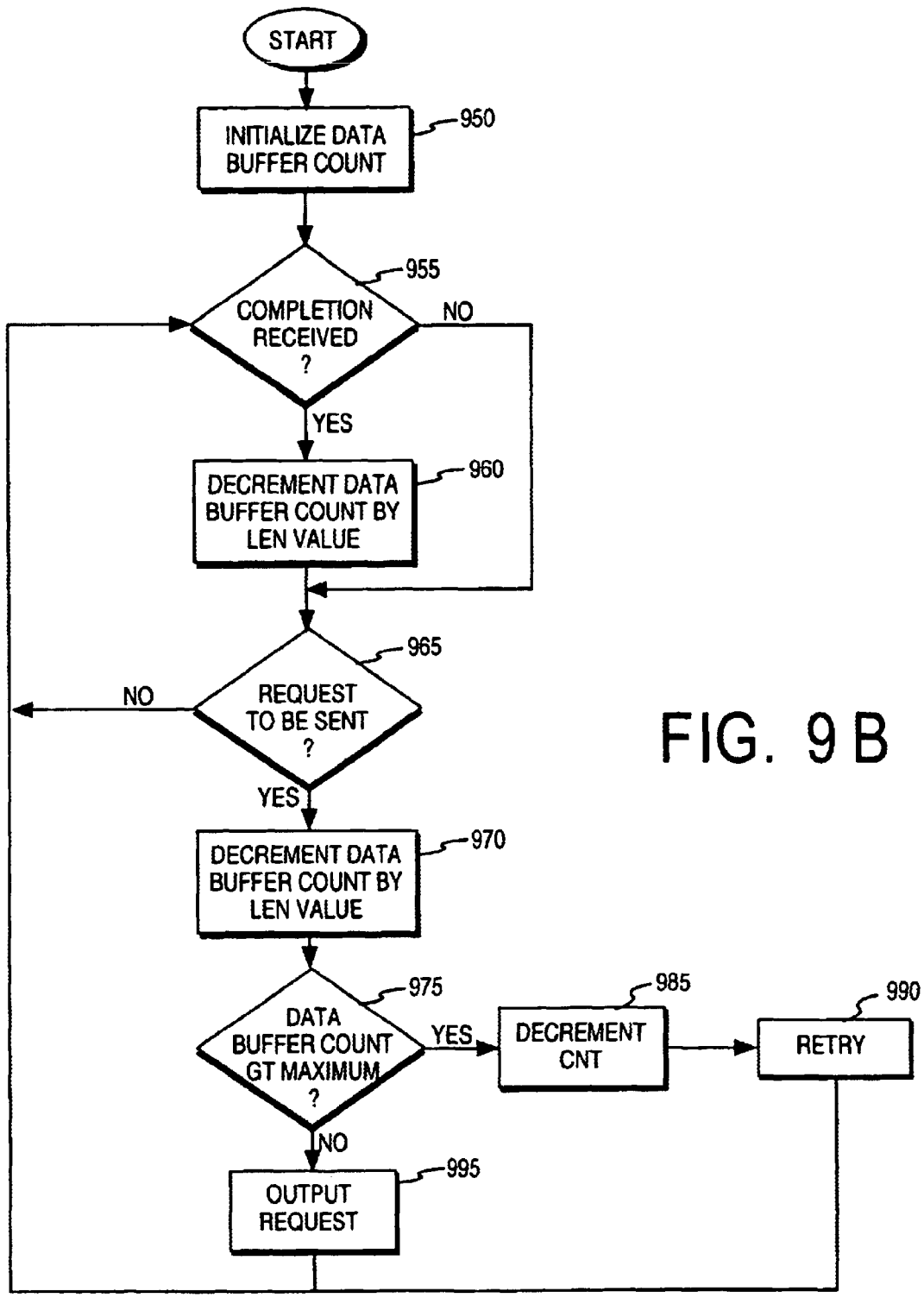
Figure 9C:
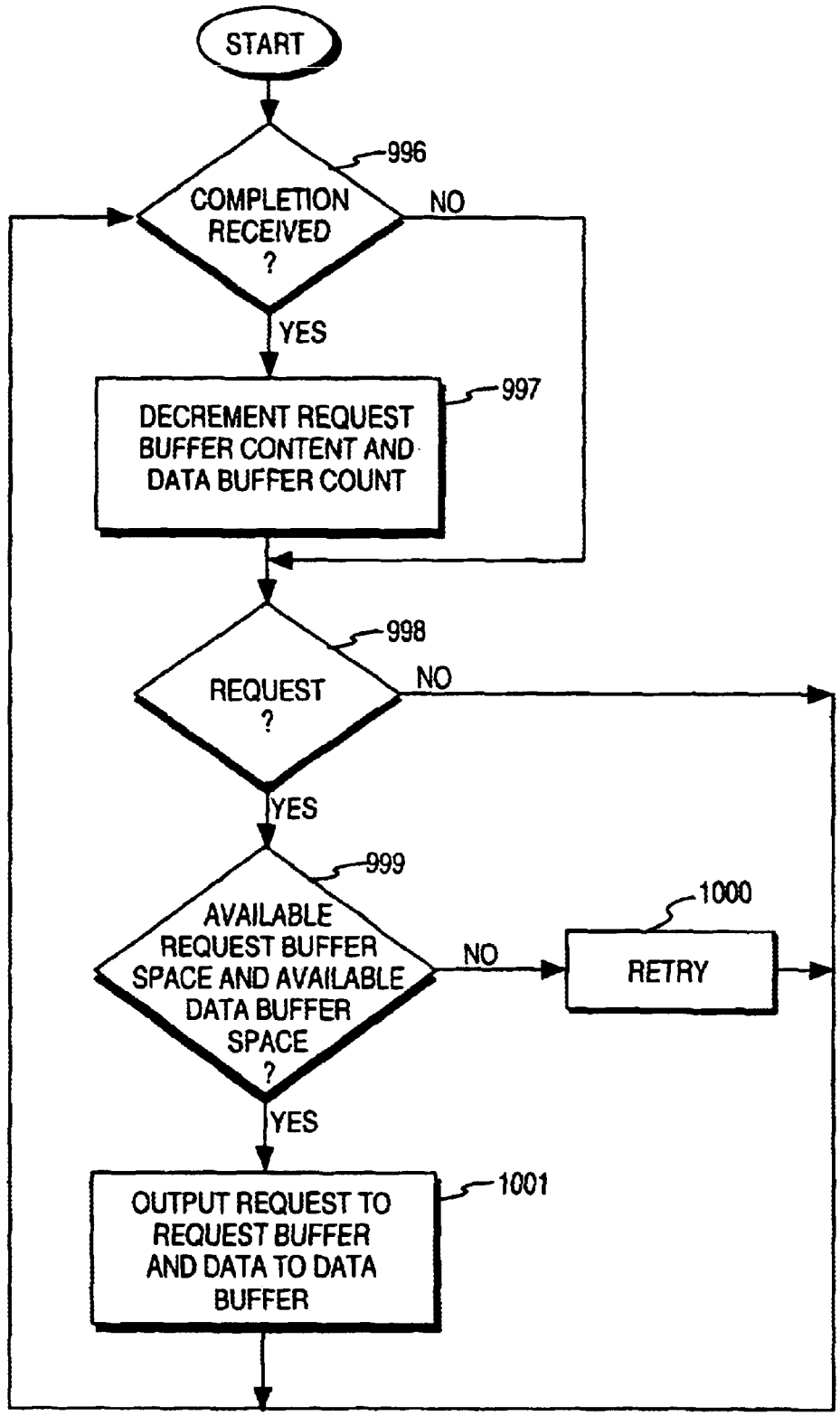

FIGS. 9*a* and 9*b* are simplified flow charts respectively illustrating the flow control process for requests and data. Although the two processes are described separately and flow control can be initiated using either one or both processes, it is preferred that both processes are used concurrently to control flow control as shown in FIG. 9*c*. In the present embodiment, the tracker maintains a count representative of the data stored in the receiving buffer. For example, tracker 824 maintains a count of requests stored in queue 852. When the count exceeds a predetermined maximum, the tracker controls the device, e.g. processor 803, to prohibit the creation of the packet, and causing the device to continue to retry issuing the request until space in the queue becomes available. In the present embodiment, a packet is not created if the tracker indicates that the receiving queue is full; it is contemplated that in other embodiments the tracker may use other mechanisms for preventing a request from entering a full queue.

Turning back to the present embodiment, if an inbound PCI (write) request, for example, is attempted from bus 820, the request will be retried until the inbound tracker 850 indicates that the inbound queue in device 805 has room for the write request. The same occurs for outbound transactions. If an inbound request queue were to accept a transaction for which there is no room in the receiving inbound queue, a deadlock can occur even though no packet is sent, until there is room in the receiving queue.

Referring to FIG. 9*a*, at step 900, the request buffer count maintained by the tracker is initialized. For example, the count may be initialized to zero. However, the actual value may be some other value such that when the count reaches the predetermined maximum corresponding to the size of the corresponding buffer, a register overflow occurs. Alternately, the count is initialized to a value corresponding to the predetermined maximum and the tracker decrements the count for each request to be sent. Thus, the buffer maximum is reached when the count reaches zero. The maximum size of the buffer may be hardcoded or read from a configuration register or fill. Preferably, the capacities of corresponding pairs of buffers, e.g. 724, 752 are checked to determine the buffer having the smaller capacity; in this situation the maximum size would correspond to the size of the buffers having the smaller capacity. Furthermore, it is contemplated that the predetermined maximum does not necessarily equal the exact capacity of the buffer and can be a value smaller than the actual buffer capacity for a variety of reasons. For example, in the present embodiment, the predetermined maximum for write requests is 6 even though the buffer capacity is 8 requests. Other embodiments are also contemplated.

At step 905, if a completion packet is received, the request tracker decrements the request buffer count, step 910, as receipt of a completion packet is indicative that the request has been processed and is no longer in the buffer. At step 915, if a request packet is to be sent, at step 920, the request buffer count is incremented and it is determined whether the count exceeds the predetermined maximum, step 925. If the count does not exceed the predetermined maximum, then the receiving buffer in the device has the capacity to receive the request and the request packet is prepared for transmission and subsequently sent out over the bus, step 940. If the count exceeds the predetermined maximum, then the available capacity of the buffer cannot accept the request packet and the request packet tracker prevents the request packet from being created or enqueued and causes the transmission process at the initiating bus to be retried, step 935.

It should be noted that FIG. 9*a* is described with respect to the transmission of request packets from a first device (e.g., device 805, FIG. 8). However, the same process is performed when the same device is to send a completion packet as the packets are buffered in the same buffer (e.g., inbound request buffer 852, FIG. 8). In addition, if the process is performed with a dual port device such as the bus bridge described above, the first device would continue to send (preferably sending to alternate buffers) until both buffers are at full capacity.

A very similar process is performed to control flow control with respect to data contained in the packet. A request packet is a determined size which fits in a predetermined amount of space. However, the amount of data is variable. Thus for data buffers, a length field in the packet is accessed to determine the amount of buffer space needed. A similar process is then performed to determine when data to be queued would cause the capacity of the data queue to be exceeded. The tracker will not allow the capacity of the data buffer to be exceeded. For example, if a device on the bus 820 wants to write 16 DWORDS (16×4 bytes), but the tracker indicates only room for 8, the control logic 882 will only accept eight DWORDS. The device (not shown) on the bus 820 must retry a write for the remaining DWORDS until the tracker indicates room for them. Alternately, control logic 882 will be configured such that the logic will not allow the generation of packets unless all data can be placed in the queue.

Referring to FIG. 9b, the data buffer count is initialized, step 950. If a completion packet is received, step 955, the data buffer count is decremented, step 960, by the length (LEN) value stored in the completion packet. By using the LEN value, accurately buffer tracking relevant to the buffer capacities can be performed. It should be noted that the LEN value is the same length as is found in the outgoing information. At step 965, if a request is to be sent, the LEN value is determined, and the data buffer count is incremented by an amount corresponding to the LEN. At step 970, if the amount of data of the packet plus the current amount of data in the buffer will exceed the capacity of the buffer, the device is prohibited from creating the packet and placing the packet in the buffer. The device subsequently will retry, 990, until the capacity of the buffer can accept the amount of data of the packet. Preferably, the requesting device can indicate that a portion of the data that fits in the remaining buffer space is to be sent (e.g., by issuing a command to the tracker). The requesting device subsequently issues requests, and retries if necessary, for the balance of the data. If the buffer count will not be exceeded, at step 995 the packet is formed by the requesting device and placed in the buffer.

As noted earlier, it is preferable that the flow control process takes into account available request buffer space and available data buffer space. If either buffer is full and cannot receive data, the request is not processed. This is illustrated by the flow chart of FIG. 9c. At step 996, it is determined if a completion packet is received and if one is received, at step 997, the request buffer count is decremented by an amount corresponding to one request and the data buffer count is decremented by an amount corresponding to the LEN value. At step 998, if a request is received, it is determined whether there is available buffer space in the request buffer and the data buffer. As the amount of data can vary, it is possible that one buffer is full while the other buffer still has capacity. If either buffer is not available to receive a request, the request is not processed and the sending device is issued a retry signal, step 1000, to indicate to retry the request later. Otherwise, at step 1001, the request is output to the request buffer and the corresponding data to the data buffer.

Thus the flow control is embedded into the packet protocol. Illustrative packets are shown in FIGS. 10a, 10b, 10c, and 10d. The flow control mechanism described refers to the type encoding (TP[1:0]), request command encoding (RCOM[4:0]), completion command encoding (CCOM [4:0]) and length (LEN[7:0]) fields which are found in the request packets (FIG. 10a) and completion packets (FIG. 10b). Preferably writes and reads are controlled separately by the tracker such that different maximum count values can be used for write requests and read requests.

For example, when a read request is pushed into the memory controller's outbound transaction queue, TP[1:0] is 00 to indicate a request with no data and RCOM[4:0] is 0 to indicate that the request is to use a read queue slot. The packet is formed and placed in the queue and the outbound read queue tracker therefore is decremented by one. When the completion packet corresponding to the read request is sent back by the PXB, TP[1:0] is [1:x], where x is 1 if the data returned and 0 if no data was return. CCOM[4:0] is 0 to indicate this is a completion for a read request. The outbound read queue tracker therefore increments the count by one. It follows that when a read completion is popped from the memory controller inbound transaction queue, the outbound read queue tracker is incremented by one. Similar operations occur with respect to the bus bridge.

When a write is to be performed, the request is pushed into the device's outbound transaction queue. TP[1:0] is 01 to indicate a request with data and RCOM[4:0] is 1 to indicate the request is using a write queue slot. The output write request queue tracker is incremented by 1. When the completion for a write request is sent back, TP[1:0] is 10 to indicate a completion with no data. CCOM[4:0] is 1 to indicate a completion for a write request. When a write completion is popped from the device's inbound transaction queue, the outbound write queue tracker is incremented by 1. As noted above, when a transaction queue tracker decrements to zero, transactions of that type can no longer be pushed into the transaction queue Preferably, the requesting device will retry any additional actions of the this type.

In the present embodiment, data buffer management is handled a little differently; however, it is contemplated that data buffer management can be handled the same way as requests. The TP[1:0], RCOM[4:0] and LEN[7:0] fields in the request packet header are used to allocate data buffers by the data buffer trackers. The TP[1:0], CCOM[4:0] and LEN[7:0] fields in the completion packet header are used to deallocate data buffers by the data buffer trackers.

For example, when a read is pushed into the memory controller outbound transaction queue, e.g. by the processor, TP[1:0] is 00 to indicate a request with no data and RCOM [0] is 0 to indicate the request is using a read queue slot. The outbound read data buffer tracker is decremented by LEN where LEN indicates data size, in the present embodiment, the number of DWORDS being requested.

When the completion packet for the read is sent back by the bus bridge, TP[1:0] is [1:x] where x is 1 if data is returned and 0 if no data was returned. CCOM[4:0] is 0 to indicate that the packet is a completion packet for a read. When a read completion is popped from the memory controller inbound transaction queue, the outbound read data buffer is incremented by LEN.

When a write packet is pushed into the memory controller outbound transaction queue, e.g. by the coupled processor, TP[1:0] is 01 to indicate a request with data and RCOM[4:0] is 1 to indicate the request is using a write queue slot. The outbound write data buffer tracker is decremented by LEN where LEN indicates the number of DWORDS being written. The value in the LEN field of the write request packet and the associated completion packet are always equal even if the write was not successful at the other bus.

When the completion packet for the write is sent back by the PXB, TP[1:0] is 10 to indicate a completion with no data. CCOM[0] is 1 to indicate that the packet is a completion packet for a write request. When the write completion is received by the outbound write data buffer tracker, the count is incremented by LEN. Normally, requests and completions leave a transaction queue in the same order as entered. This is necessary to preserve proper transaction ordering, i.e., the order of occurrence on one bus is the same as the order on the receiving bus. However, a write completion contains no data, hence, no ordering requirement. Therefore, it is preferred that the completion packet is sent directly to the tracker.

When a data buffer tracker decrements to zero or has insufficient data buffers for a particular request, that request cannot be pushed into the transaction queue. The data buffer tracker's bus interface will therefore retry any additional transactions of that type. Similar logic is used to support write packets issued by the bus bridge.

A simplified example of the embedded flow control process is illustrated below. For purposes of discussion, the example is simplified and does not take into account other configuration parameters such as those related to prefetching. In addition, the below example and the discussion that follows discusses the flow control mechanism in the context of a device, such as a memory controller, coupled through the high speed bus of the present invention to a PCI bus bridge expander that transfers the data to 2–32 bit PCI busses or 1–64 bit PCI bus.

Data Buffer Tracker (Separate Tracker for Transactions)

| Request | Write Data Tracker Count | Write Transaction Slots | Read Data Buffer Tracker Count | Read Transaction Slots | Action |
|---|---|---|---|---|---|
| Any Read | x | x | 0 | x | Retry |
| Bus Bridge (BB) Read | x | x | 8 | >0 | Request up to 8 DWORDS |
| BB Read Multiple | x | x | 8 | >0 | Request up to 8 DWORDS |
| Mem Read Partial (1 DWORD) | x | x | 1 | >0 | Request 1 DWORD |
| Mem Read Partial | x | x | x | 0 | Retry |
| Mem Read Partial (2 DWORDS) | x | x | 1 | >0 | Read 1 DWORD |
| Any Write | 0 | x | x | x | Retry |
| Mem Write Partial (1 DWORD) | >1 | >1 | x | x | Write 1 DWORD |
| Mem Write Partial (2 DWORDS) | 1 | 1 | x | x | Write 1DWORD 2nd DWORD must Retry |
| BB Write | 8 | >0 | x | x | Burst until 8 DWORDS |
| BB MWI (line = 8 DWORDS) | <8 | x | x | x | Retry (must have 8 DWORDS of buffer |
| Mem Write Partial (1 DWORD) | x | 0 | x | x | |

Certain transactions demand a fixed number of DWORDS to transfer. For example, a line write command (PCI MWI) must transfer a full line. If a line consists of 8 DWORDS and less than 8 DWORDS of buffering is available, the transaction must be retried. A normal write burst, however, could result in a portion of the number of DWORDS being accepted and the remainder being retried. For example, Memory Read Line (MRL) transaction would be retried unless buffer space corresponding to a full line of DWORDS is available.

As noted above, the bus bridge is preferably configured to route packets for dual 32 bit operating modes and single 64 bit operating modes. In dual 32 bit mode the 'a' and 'b' transaction queues operate independently on their respective buses. The only interaction occurs at the high speed bus interface where one or the other set of queues send or receive on the high speed bus between the bus bridge and the memory controller.

In single 64 bit mode the outbound transaction queues are paired up to appear as a single outbound queue and the inbound transaction queues are paired up to appear as a single inbound transaction queue. Effectively, the 64 bit PCI bus interface has twice the queue depth of each of the dual 32 bit PCI interfaces. Thus, queue tracking is configurable to track a pair of inbound/outbound queues as well as a single set of queues.

The outbound transaction queues are treated in a similar manner to the inbound transaction queues. If an outbound transaction from the high speed bus interface enters the 'a' outbound queue (OutQa), the next outbound transaction will enter the 'b' outbound queue (OutQb) and so forth. At the bus bridge interface, logic (e.g., a state machine) toggles between OutQa and OutQb. Starting at OutQa, the first outbound transaction is attempted on the bus coupled to the bus bridge (e.g., a PCI bus). If the transaction completes, it is popped from OutQa and the completion packet is pushed into whichever inbound queue the queue pointer currently is pointing. Next, the transaction at the top of OutQb is attempted. If every outbound transaction completes on first attempt, the outbound queue pointer keeps toggling with each completed transaction.

If a read transaction at the top of the outbound queue is retried, it is moved into the corresponding read request queue RRQ (a or b) and the outbound queue pointer toggles to the other queue. If a write transaction at the top of the outbound queue is retried, it is preferred that the queue pointer does not toggle. A retried write must succeed before the outbound queue pointer will toggle to the opposite queue. However, between attempts to complete the write at the top of the current queue, any reads in either RRQ may also be attempted. Once the current outbound write succeeds it is popped from the queue and a completion packet is inserted into the current inbound queue. The outbound queue pointer will then toggle to the opposite queue even if an uncompleted read remains in the RRQ.

In summary, the outbound queue pointer toggles to the opposite queue as soon as a transaction is popped from the current queue. A retried write is not popped until it succeeds. A retried read is popped from the outbound queue and pushed into the RRQ. A read in a RRQ can be attempted at any time because its ordering requirements were met at the time it was popped from the outbound queue. (Note that outbound reads in one RRQ can pass outbound reads in the other RRQ in a 64 bit PCI mode.)

In 32 bit mode, an outbound transaction is routed from the high speed bus to either outbound queue 'a' or 'b' depending upon the packet's destination identification (Destination ID). Multiplexors select the next outbound request or a previously retired read as discussed in the previous section. Preferably a separate multiplexor is used for 64 bit PCI mode. When the bus bridge initiates a PCI transaction in 64 bit mode, a multiplexor selects the command and address bits from either outbound queue 'a' or outbound queue 'b'.

Inbound transactions can address more than 32 bits so both inbound queues support dual address cycle (DAC) decode in 32 bit mode and 64 bit mode. The inbound request queues have separate latch enables for upper and lower 32 bits of address. In 32 bit mode, the low order address is latched in address latch 'a' or address latch 'b' for PCI bus 'a' or 'b' respectively. The inbound request queue latches the low order address prior to the next PCI clock in preparation for the arrival of the high order address of a DAC. If the inbound transaction is a single address cycle transaction, zeros must be loaded into the high order address field of the inbound request queues.

In 64 bit mode, the inbound transaction can be initiated by either a 32 bit PCI master or 64 bit PCI master. DAC is required to be asserted on C/B[3:0] in packets by 32 bit and 64 bit PCI masters (e.g., memory controller) addressing above 4 GB because it is unknown to the master at this time if the target is 64 bit capable or not. A 64 bit PCI master is not required to drive the high order address bits to zero for addresses below 4 GB. If REQ64# is asserted with FRAME# and the. PXB decodes DAC on C/B[3:0] during the first address cycle, it can immediately decode the full address. If C/B[3:0] does not indicate DAC, the PXB must force the high order address to all zeros before decoding the address.

As noted previously, it is preferred that the data buffers exist as separate structures from the transaction or request queues. The data for PCI transactions is stored in a separate queue structure from the transaction queues. This data queue structure is referred to as the data buffers or the data queues. Separate queues are needed for data because the transactions and completions in the transaction queues do not always get retired in the same order that they entered the transaction queues. For example, write transactions may pass read transactions in the same direction. Also, PCI delayed reads get retired in the order that the PCI masters return for their data which is not necessarily the same order that the read requests or read data were received.

In dual 32 bit PCI mode when an inbound PCI write transaction enters InQa, the data that follows the address and command on the PCI bus will enter the PW Data 1 inbound data queue. When the associated write packet is sent over the F16 bus, the packet header containing the write command and address will be pulled from the InQa transaction queue and the write data will be pulled from the PW Data 1/DRPLY Data 1 inbound data queue. Likewise, an inbound PCI write on PCI Bus 'b' pushes the command and address into InQb and the associated data that follows on the PCI bus is pushed into PW Data 2 inbound data queue.

In dual 32 bit PCI mode, an outbound 32 bit PCI read to PCI bus 'a' is pulled from OutQa or RRQa when the read succeeds on the PCI bus and a Read Completion is pushed into the InQa inbound transaction queue. The associated read data enters the PW Data 1/DRPLY Data 1 inbound data queue. When the Completion packet is sent over the F16 bus, the packet header containing the read completion identifier will be pulled from the top of the InQa transaction queue and the read data will be pulled from the PW Data 1/DRPLY Data 1 inbound data queue.

Each 32 bit PCI port can have two inbound PCI reads outstanding. An inbound PCI read on PCI port a is pushed into InQa if there is a slot available in the PXB inbound queue for a read and there are inbound read data buffers available in the PXB and MIOC. At this time the inbound delayed read completion tracker is loaded with the command and address fields of the inbound read so that it can identify the PCI master requesting the read. A transaction identifier unique to this inbound transaction is also loaded into the inbound delayed read completion tracker so that the read completion can be identified when it arrives in the OutQa. When the inbound read completes on the P6 bus, a delayed read completion (DRC) packet containing the read data will arrive to the bus bridge over the high speed bus. The DRC translation header containing the inbound read identifier will be pushed into OutQa. The read data that follows in the packet will be pushed into DRC Data 1 data queue or DRC 2 data queue depending upon which DRC data queue was assigned to this inbound read. When the PCI master returns for its data (it will be continuously retired until the data arrives) it will receive the data from DRC Data 1 or DRC Data 2 data queue if the associated inbound read completion has been popped from the top of the OutQa transaction queue and marked the inbound read as complete in the inbound delayed read completion tracker.

In 64 bit PCI mode, the two sets of data buffer queues are paired similar to the transaction queue in 64 bit PCI mode. An inbound write will result in data being alternately pushed into PW Data 1 and PW Data 2 data queues. The data queues are 32 bits wide (DWord). If data is received 64 bits at a time from a 64 bit PCI master and the data queue pointer is pointing at PW Data 1 queue, the first DWord is pushed into PW Data 1 data queue and the next DWord is pushed into PW Data 2 date queue. Additional DWORDS alternate between the two inbound data queues.

The DRC data queues and write data queues are paired and interleaved in a similar fashion.

The innovative packet format described above in addition to embedding flow control information, also provides at least one field referred to herein as the transaction identification (TID) field, that can be used in a variety of ways. The field is preferably configurable, depending upon the application. The advantage is that the sending device, i.e., the device issuing a request packet, can store predetermined data in this field, e.g., a transaction identifier or other identifier. The control logic of the receiving device, after processing the request and preparing the completion packet, simply copies the contents of the field into the completion packet for transmission back to the initial sending device. Thus, the configuration can be such that the field contents is meaningful only to the sending device as the receiving device simply copies the contents and sends it back. Furthermore, as the packet is not limited to specific data, the field can be used for a variety of purposes. Furthermore, as the receiving device simply copies the contents into the completion packet, the contents remain undisturbed.

Figure 11:
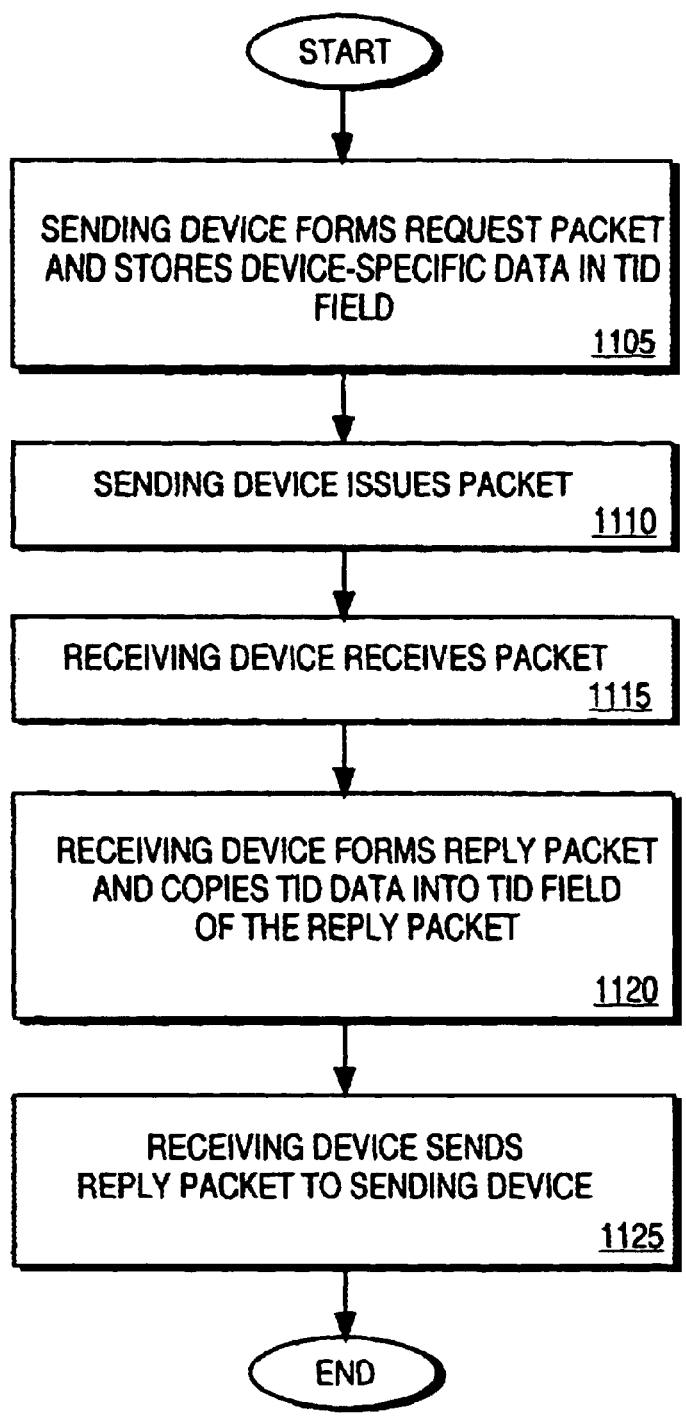
FIG. 11 is a simplified flow diagram of one embodiment of a process using a device configurable field in accordance with the teachings of the present invention.

This process is described generally with reference to FIG. 11. At step 1105, the sending device forms a request packet. The request packet includes the transaction ID field which is used to store requesting device data. At step 1110, the request packet is issued and at step 1115, the receiving device receives the packet and forms a reply packet, step 1120. The receiving device simply copies the TID field into the reply packet for subsequent access by the sending device. Thus, the contents of the TID are not required to be interpreted by the receiving device as a simple copy operation is all that is required. At step 1125, the reply packet, including the copied contents of the TID field, is sent back to the requesting device.

In the present embodiment, the field is used for a deferred outbound read (processor to PCI) transaction. A deferred transaction is a split transaction where the read is split into the initial read request followed at a later time by a deferred reply. The requested data is returned by the deferred reply. Thus, the device and transaction ID of the read requester is put into the TID field. When the completion packet with the read data is sent, the TID is copied from the request packet to the completion packet. When the completion reaches the top of the inbound request queue, a deferred reply is sent to the requesting processor. The deferred reply copies the completion TID into the deferred reply where it is used to address the processor that initiated the original read.

The invention has been described in conjunction with the preferred embodiment. It is evident that the numerous alternatives, modifications, variations, and uses will be apparent to those skilled in the art in light of the foregoing description.

What is claimed is:

1. A method for dynamically sending device data in a bus transaction comprising the steps of:

a first device generating a request comprising a plurality of fields including a device configurable field comprising device configurable data;

said first device issuing the request to a second device;

said second device generating a reply comprising a plurality of fields;

said second device copying the data received in the device configurable field into a designated field of the plurality of fields of the reply;

said second device issuing the reply to the first device.

2. The method as set forth in claim 1, wherein the designated field is located at a location in the reply that corresponds to a field location of the device configurable field of the request.

3. The method as set forth in claim 1, wherein the device configurable field is used by the first device to store a transaction identification of a transaction issued by the first device.

4. The method as set forth in claim 3, further comprising the step of the first device reading the designated field to determine the identification of the request the reply corresponds to.

5. A bus system comprising:

a bus a first device coupled to the bus, said first device configured to issue a request comprising a device configurable field comprising device configurable data;

a second device coupled to the bus and configured to receive the request and copy the device configurable data into a designated field of a reply and issue the reply to the first device.

6. The bus system as set forth in claim 5, wherein the designated field is located at a location in the reply that corresponds to a field location of the device configurable field of the request.

7. The bus system as set forth in claim 5, wherein the device configurable field is used by the first device to store a transaction identification of a transaction issued by the first device.

8. The bus system as set forth in claim 7, further comprising the step of the first device reading the designated field to determine the identification of the request the reply corresponds to.

9. A bus comprising a plurality of bus lines configured to convey device configurable data from a first device to a second device during transmission of a request and further configured to convey the device configurable data from the second device to the first device during transmission of a reply to the request.

10. The bus as set forth in claim 9, wherein the device configurable data comprises a transaction identification.

* * * * *